Jan. 11, 1949. W. McCASKELL 2,459,082
FILTER
Filed July 11, 1945
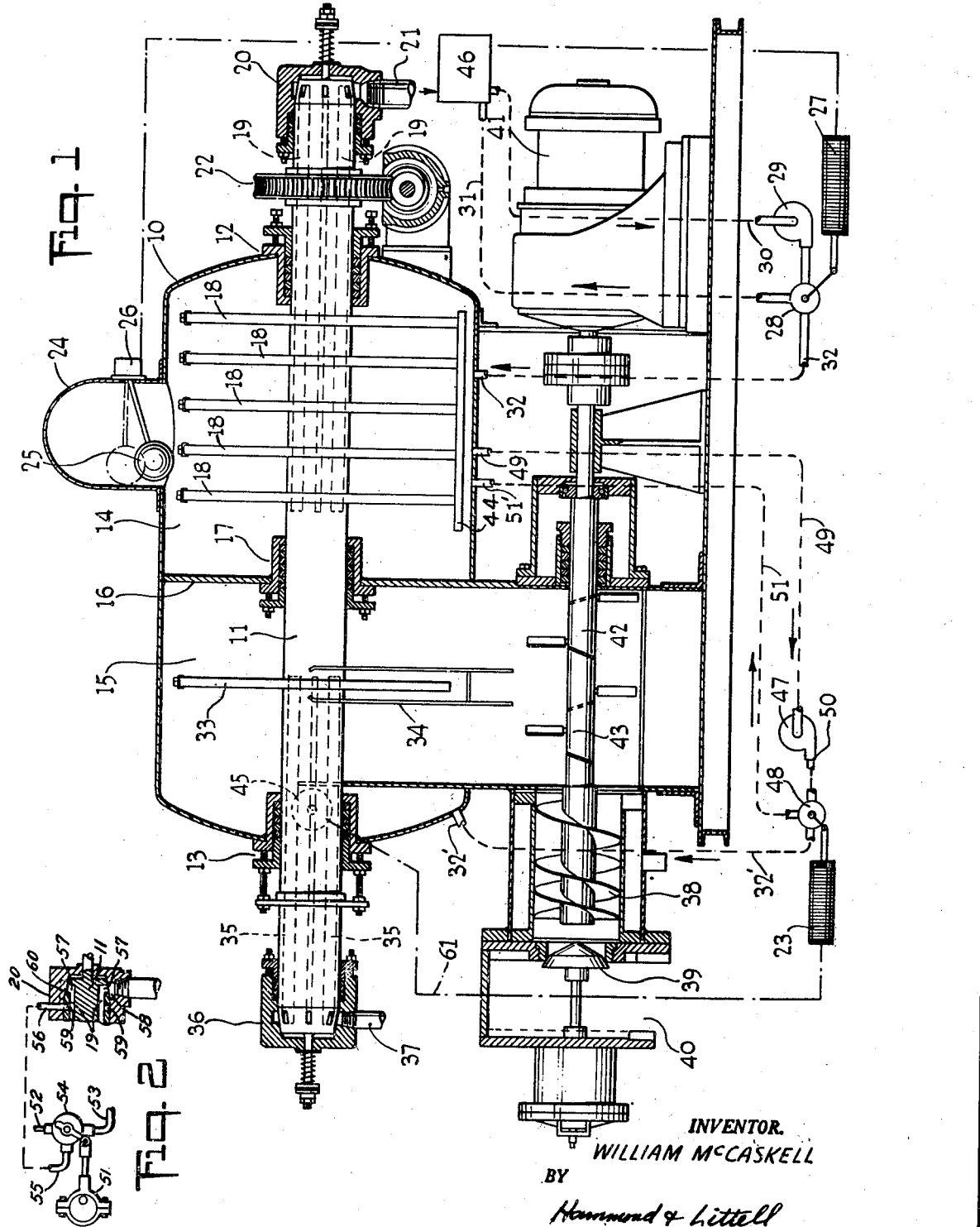
INVENTOR.
WILLIAM McCASKELL
BY
Hammond & Littell
ATTORNEYS Patented Jan. 11, 1949

2,459,082

UNITED STATES PATENT OFFICE 2,459,082

FILTER

William McCaskell, Los Angeles, Calif.

Application July 11, 1945, Serial No. 604,363

9 Claims. (Cl. 210—200)

This invention relates to filters of the pressure or vacuum variety and more particularly to an improved arrangement for handling slurries having a low percentage of solids.

In order to obtain efficient operation of leaf type filters, such as disclosed in Patent No. 1,266,133 issued May 14, 1918, or in Patent No. 1,259,139 it is desirable that there be a certain amount of filter cake on the surface of the filter elements. When filtering a substance such as a refined cottonseed oil, which has only 2½% clay or other solid material, considerable time is required to build up a cake sufficient to obtain efficient operation.

One of the objects of the present invention is to provide a unitary filter arrangement having a compartment for thickening the slurry before transfer to a second compartment wherein the dry filter cake may be removed in a convenient form. Another object is to provide means to control the flow of thickened slurry to the dry filter cake portion of the device. These and other objects of the invention will become apparent from the following description and drawings which are merely exemplary.

In the drawings:

Fig. 1 is an elevation view partially in section with a portion of the piping shown in schematic form.

Figure 2 is a fragmentary schematic view of one type of valve arrangement causing pulsation of the filter elements.

In the preferred form shown, container 10 may have a shaft 11 passing therethrough supported in bearings 12 and 13 of conventional stuffing box construction. The container 10 is divided into two compartments 14 and 15 by means of division plate 16, said division plate having a bearing and stuffing box arrangement 17 therein for preventing the flow of slurry between the two compartments. In the slurry thickening compartment 14, the shaft preferably has a plurality of leaf type filter elements shown diagrammatically at 18. A plurality of elements may be used because the slurry has but few solids and a high percentage of liquor. The filter elements are connected through passages 19 in a conventional manner to the valve box 20 suitably held on the end of the shaft. Filtrate is removed from the interior of the leaf filters 18 through passages 19, valve box 20, and pipe 21. Pressure also may be applied through pipe 21, or by a suitable valve arrangement, to the interior of the filter element so as to cause pulsation thereof to remove the formed filter cake, such as seen in Patent No. 1,700,772 or Patent No. 1,835,796. As an example of one manner of causing pulsation of the filter elements, eccentric 51 (Fig. 2) can be driven in some suitable manner from shaft 11 such as by a spur gear placed on the shaft in any desired place. Pipe 52 may be connected to a pressure source relative to chamber 14 and pipe 53 to a vacuum. Three-way valve 54 is operable by means of eccentric 51 to alternately connect pipe 55 with pressure pipe 52 and vacuum pipe 53. Pipe 55 is connected to inlet passage 56 in valve box 20 and passages 19 in shaft 11 are connectable by passages 57 with chamber 58 which extends circumferentially around the end of the shaft 11. By-pass openings 59 communicate with passage 19. A blank sector 60 is provided in valve box 20 so as to close off one or more of passages 57 when bypass 59 is in registry with pipe connection 56. As shaft 11 revolves, alternate pressure and vacuum will be applied to the leaves through passage 56. The shaft 11 may be rotated by means of worm wheel and gear arrangement 22. An agitator blade arrangement 44 may be mounted on the filter elements so as to keep the cake from filling up in the bottom of compartment 14.

In dome 24, a ball float 25 can be used to operate switch 26 for control of solenoid 27 of three-way valve 28. Suction pump 29 is connected on the suction side through pipe 30 to supply tank 46. Pipe 32 from three-way valve 28 is used to form a path for the slurry from pump 29 to thickener compartment 14. Pipe 31 from the three-way valve serves as a return to recirculate the slurry back to supply tank 46. When float valve 25 lowers, it operates solenoid 27 in such a manner as to turn three-way valve 28 to supply slurry from supply tank 46 to thickener compartment 14. As the level rises in compartment 14, float valve 25 operates three-way valve 28 to return slurry through pipe 31 back to the supply tank 46.

Float control 45 is connected by means of electrical connections 61 to solenoid 23. When float 45 is in a raised position due to the level in compartment 15, solenoid 23 will be actuated to turn the control valve 48 so that slurry will be recirculated back to compartment 14. When liquid level in compartment 15 lowers, float 45 will be lowered to operate three-way valve 48 to conduct thickened slurry or liquid from compartment 14 through outlet pipe 49, pump 47, outlet 50 through inlet 32' to compartment 15. When the proper level is reached in compartment 15, float valve 45 will operate solenoid 23 and three-way valve 48 to recirculate slurry from outlet 50 of pump 47 back to slurry thickener compartment 14 through pipe 51'.

A single row leaf filter 33 may be mounted on shaft 11 in compartment 15 as indicated, said filter having conventional scraper plates 34 for scraping filter cake from the filter element. Leaf 33 may also be of a drum type construction. Passages 35 in shaft 11 lead from the interior of the leaf filter elements 33 to valve box 36, and pipe 37. The filter cake, which is scraped from filter elements 33, is relatively dry and falls to the bottom of the container and can be removed by screw 38 to valve 39 where it passes to outlet 40 in a relatively dry cake form. Motor drive 41 can be employed to operate shaft 42 which drives screw 38 and agitator blades 43.

Summarizing the operation, slurry having a low percentage of solids is supplied to the slurry thickening compartment 14 wherein filtrate is removed through pipe 21, pressure pulsations being applied to the filter elements, if desired, in order to remove at least some of the sludge or cake thereon. Pump 29 will feed slurry to compartment 14 until float 25 is raised by the level therein whereupon solenoid 27 will be actuated to operate valve 28 and recirculate slurry to supply tank 46. Pump 47 will feed thickened slurry from compartment 14 to compartment 15 as float 45 is in its lowermost position. Filter element 33 will allow removal of filtrate through pipe 37 and filter cake will fall to the bottom of the compartment. Screw 38 will then remove the comparatively dry filter cake through valve 39.

Various modifications of the invention may be made without departing from the spirit of the invention or the scope thereof as defined in the appended claims.

I claim:

1. In a filter of the class described, the combination comprising a closed container rotating means connected to said shaft for rotating the same having two separated and closed compartments, a shaft extending therethrough, a slurry thickener in one compartment of said container including filter means mounted on said shaft, means to withdraw filtrate from said compartment through said shaft and filter, a second filter mounted on said shaft in a second compartment, means to transfer thickened slurry from said first compartment to said second compartment, means to remove filtrate from said second filter through said shaft, and means to remove filter cake from said second compartment.

2. In a filter of the class described, the combination comprising a container having two compartments, a slurry thickener in one compartment of said container including filtering means, means to withdraw filtrate from said filter, filter means in a second compartment, means to transfer thickened slurry from said first compartment to said second compartment, level control means in said second compartment connected to said means to transfer thickened slurry to feed thickened slurry from said first compartment to said second compartment when the level of slurry in said compartment reaches a predetermined level, means to remove filtrate from said second filter, and means to remove filter cake from said second compartment.

3. In a filter of the class described, the combination comprising a container having two compartments, a slurry thickener in one compartment of said container including filtering means, filtrate being passable through said thickener, means to withdraw filtrate from said compartment and through said thickener, filter means in a second compartment, means to transfer thickened slurry from said first compartment to said second compartment including a pump with an inlet connected to said first compartment, and valve means selectively connecting the outlet of said pump to said first and second compartments.

4. In a filter of the class described, the combination comprising a container having two compartments, a slurry thickener in one compartment including filtering means, filtrate being passable through said thickener, filter means in a second compartment, means to transfer thickened slurry from said first compartment through said thickener to said second compartment including a pump with an inlet connected to said first compartment, a three-way valve selectively connecting the outlet of said pump to said first and second compartments, and control means in said second compartment for operating said valve to transfer slurry from said first compartment to said second compartment when the slurry therein is below a predetermined level.

5. In a filter of the class described, the combination comprising a container having two compartments, a slurry thickener in one compartment of said container including a filtering means, means to withdraw filtrate from said filter, a leaf filter means in a second compartment, and means to transfer thickened slurry from said first compartment to said second compartment including a three-way valve, float means in said second compartment for controlling said valve to transfer thickened slurry to said second compartment when the slurry therein is below a predetermined level.

6. In a filter of the class described, the combination comprising a container having two compartments, a slurry thickener in one compartment of said container including filtering means, filtrate being passable through said thickener, means to withdraw filtrate from said compartment through said thickener, filter means in a second compartment, means to transfer thickened slurry from said first compartment to said second compartment including a pump with an inlet connected to said first compartment, valve means selectively connecting the outlet of said pump to said first and second compartments, and means for supplying and controlling the level of slurry in said slurry thickener.

7. In a filter of the class described, the combination comprising a container having two compartments, a slurry thickener in one compartment of said container including filtering means, filtrate being passable through said thickener, means to withdraw filtrate from said compartment through said thickener, filter means in a second compartment, means to transfer thickened slurry from said first compartment to said second compartment including a pump with an inlet connected to said first compartment, valve means selectively connecting the outlet of said pump to said first and second compartments, a supply tank, a second pump having the inlet thereof connected to said tank, second valve means selectively connecting the outlet of said pump to said slurry thickener compartment and to said supply tank, and float control means in said slurry thickener compartment to control said second valve.

8. In a filter of the class described, the combination comprising a container having two compartments, a shaft passing therethrough, a slurry thickener in one compartment of said container including a plurality of leaf filter elements mounted on said shaft, means to withdraw filtrate from said filter elements through said shaft, means to pulsate said filter elements, a leaf filter mounted on said shaft in a second compartment of said container, a slurry pump connected to said first compartment, a three-way valve in the outlet of said pump for transferring slurry to said second compartment and for returning it to said first compartment, level control means in said second compartment for operating said three-way valve to cause transfer of thickened slurry from said first compartment to said second compartment when the level of slurry in said second compartment reaches a predetermined level, means to remove filtrate from said second leaf filter, and screw conveyor means to remove filter cake from the bottom of said second compartment.

9. In a unitary filter of the class described, the combination comprising a closed container having two closed compartments, a slurry thickener including filtering means in a first compartment of said container, means to feed slurry to said slurry thickener compartment, means to withdraw filtrate from said slurry thickener, a filter in said second closed compartment of said container, means automatically controlled to transfer thickened slurry from said first compartment to said second compartment, means to remove filtrate from said second compartment filter, and means to remove filter cake from said second compartment.

WILLIAM McCASKELL.

REFERENCES CITED

The following references are of record in the file of this patent:

UNITED STATES PATENTS

| Number | Name | Date |
| --- | --- | --- |
| 1,494,122 | McCaskell | May 13, 1924 |
| 1,835,796 | McCaskell | Dec. 8, 1931 |

FOREIGN PATENTS

| Number | Country | Date |
| --- | --- | --- |
| 465,615 | Germany | Sept. 20, 1928 |